United States Patent [19]

Tsuji et al.

[11] Patent Number: 5,033,878
[45] Date of Patent: Jul. 23, 1991

[54] CAGE FOR SPHERICAL ROLLER BEARING

[75] Inventors: Yasuyuki Tsuji, Kuwana; Motoharu Niki, Kitakatsuragi, both of Japan

[73] Assignee: NTN Corporation, Osaka, Japan

[21] Appl. No.: 541,864

[22] Filed: Jun. 21, 1990

[30] Foreign Application Priority Data

Jun. 28, 1989 [JP] Japan .................................. 1-167657

[51] Int. Cl.⁵ .......................................... F16C 33/56
[52] U.S. Cl. .................... 384/576; 384/580
[58] Field of Search ............... 384/576, 580, 572, 558, 384/909, 527

[56] References Cited

U.S. PATENT DOCUMENTS

| | | | |
|---|---|---|---|
| 3,494,684 | 2/1970 | Benson | 384/580 |
| 3,598,459 | 8/1971 | Vannest | 384/580 |
| 4,541,743 | 9/1985 | Hatano | 384/576 |
| 4,629,339 | 12/1986 | Morinaga | 384/576 |

Primary Examiner—Lenard A. Footland
Attorney, Agent, or Firm—Armstrong, Nikadio, Marmelstein, Kubovcik & Murray

[57] ABSTRACT

A cage has a pair of annular bodies and a plurality of columns provided at equal spacings to couple the annular bodies together to receive spherical rollers therebetween. The columns have side faces each having both axial end portions thereof formed by a composite surface having a flat surface provided outside the pitch circle of the spherical rollers and a conical surface provided inside the pitch circle. Each flat surface is inclined with respect to a plane including the axis of each spherical roller and the axis of the cage so as to come into point-to-point contact with the outer periphery of the respective spherical roller while the bearing is rotating. Each flat surface intersects each plane including the abovementioned axes along a line intersecting the axis of each spherical roller at a right angle.

1 Claim, 3 Drawing Sheets

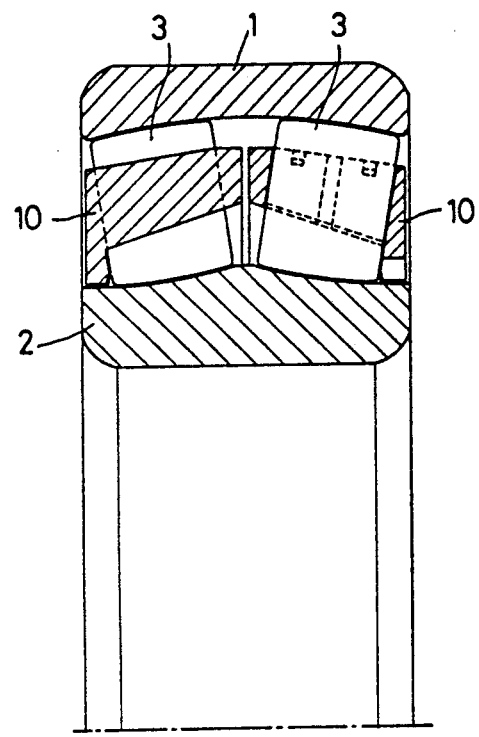
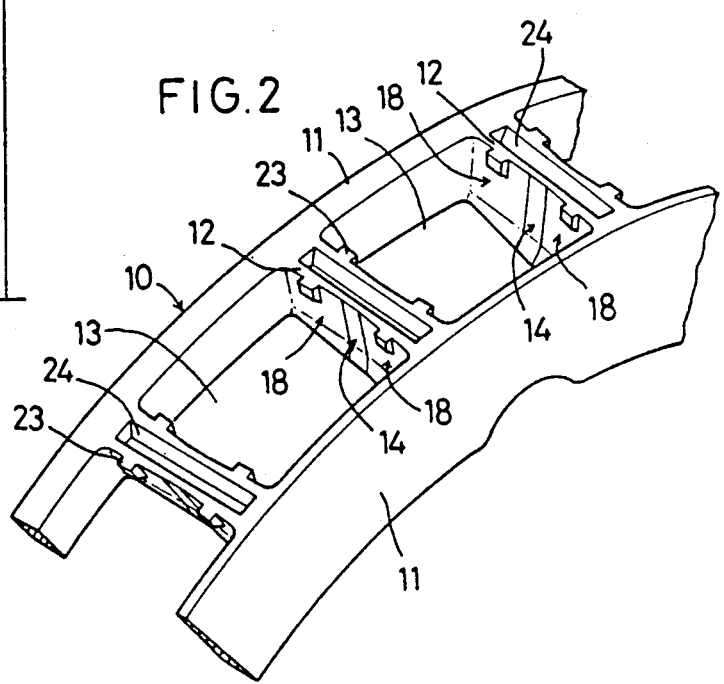
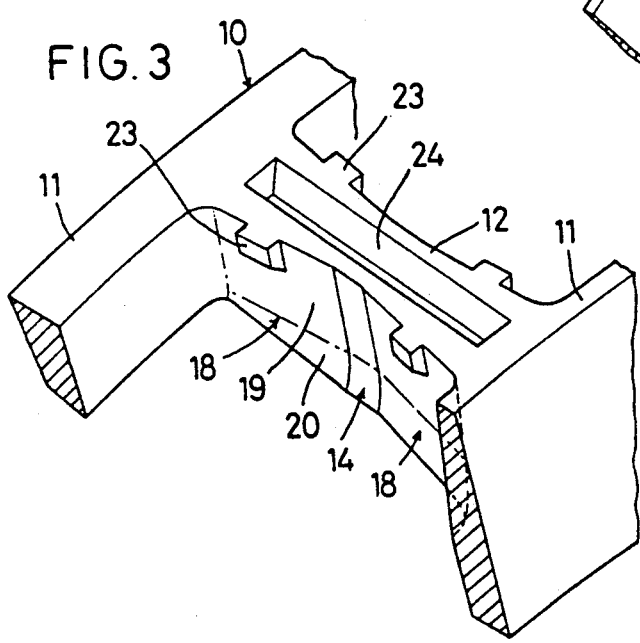

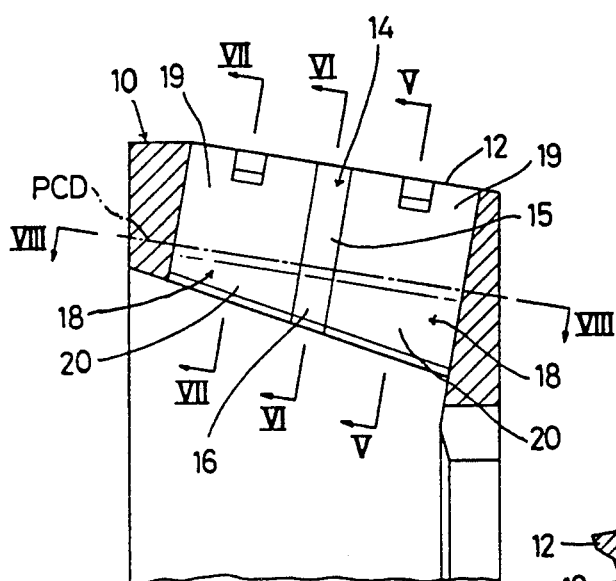
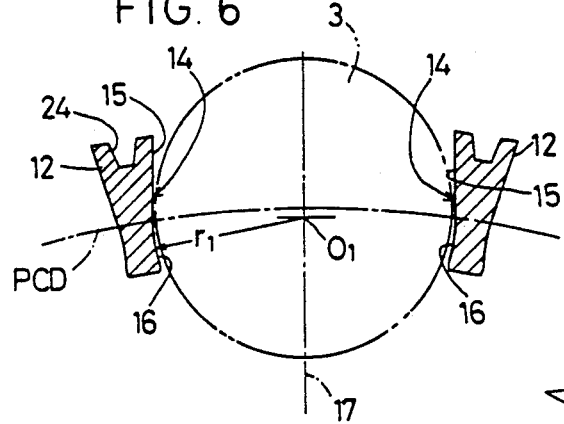
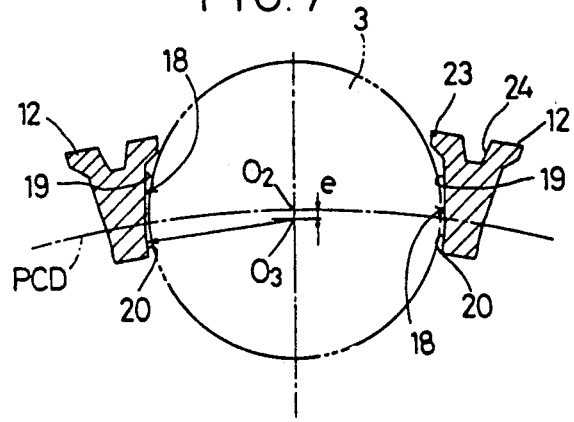
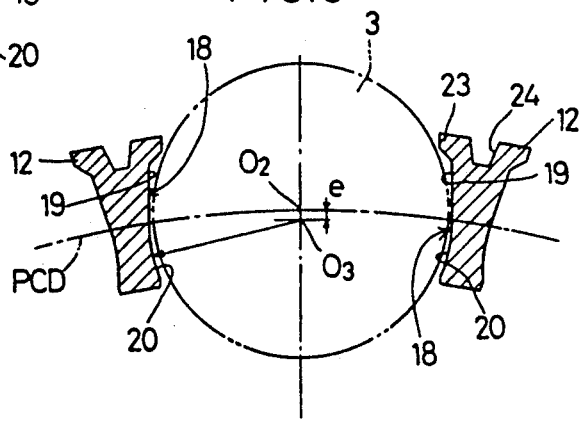
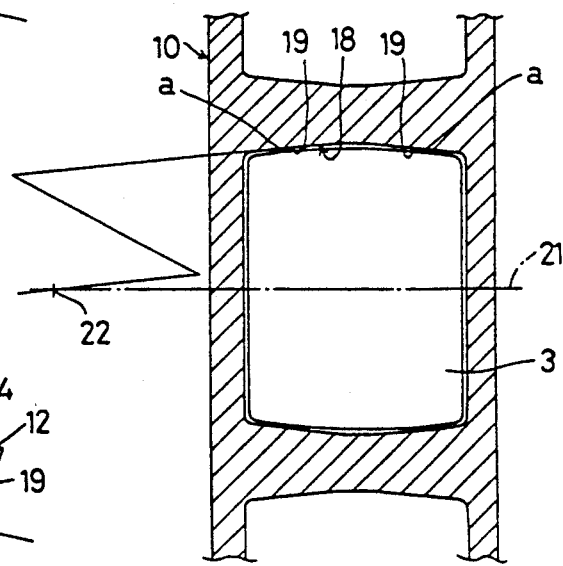

CAGE FOR SPHERICAL ROLLER BEARING

BACKGROUND OF THE INVENTION

This invention relates to a cage made of synthetic resin for a self-aligning roller bearing.

FIGS. 9 and 10 show a prior art cage of this type. It comprises a pair of annular bodies 30 integrally coupled together by means of a plurality of columns 31 arranged at equal circumferential intervals to define pockets 33 for retaining spherical rollers 32 between the adjacent columns 31.

The columns 31 have their side face 34 arcuately curved in such a shape as to conform to the outer periphery of the spherical rollers 32 so that the side faces 34 and the spherical rollers will make a surface-to-surface contact with each other when the bearing is in operation.

With such a prior art cage, since clearances 35 are formed between the side faces 34 of the columns 31 and the outer periphery of the spherical rollers 32 to allow the spherical rollers to move in the clearances 34, they tend to skew. Also, since the size of the clearances 35 is uniform in the axial direction of the spherical rollers 32, the flowability of lubricating oil is poor.

SUMMARY OF THE INVENTION

It is an object of this invention to provide a cage which can prevent the spherical rollers from skewing and improve the lubricating effect.

In accordance with the present invention, there is provided a cage made of synthetic resin for use in a self-aligning roller bearing having a plurality of spherical rollers, the cage comprising a pair of annular bodies, and a plurality of columns provided at circumferentially equal spacings to integrally coupled the annular bodies together and form a plurality of pockets for retaining the spherical rollers therein, the columns each having side faces formed at both axially end portions thereof with a composite surface comprising a flat surface provided outside the pitch circle of the spherical rollers and a conical surface provided inside the pitch circle, the flat surface being inclined with respect to a plane including the axis of the each spherical roller and the axis of the cage so as to come into point-to-point contact with the outer periphery of the respective spherical roller while the bearing is rotating. The flat surface intersects the plane along a line which intersects the axis of each spherical roller at a right angle, each column being formed on each side face at the side of the outer diameter with protrusions to prevent the spherical rollers from coming out of position. The conical surface has its center offset from the axis of each spherical roller toward the inner diameter side and having its radius gradually increasing toward the center of the respective side faces of the columns.

While the bearing is rotating, each spherical roller comes into contact with the side faces of the columns at two points located apart from the maximum-diameter point of the spherical rollers toward their ends. The contact points are located on a plane including the axis of each spherical roller and extending in a tangential direction with respect to the pitch circle of the spherical rollers. Thus they are prevented from skewing.

Since each of the side faces of the columns for guiding the spherical rollers comprises a flat surface and a conical surface, wedge spaces are defined between the side faces of columns and the outer periphery of the spherical rollers. The wedging action of these wedge spaces will enhance the absorption of lubricating oil.

Other features and objects of this invention will become apparent from the following description taken with reference to the accompanying drawings, in which:

BRIEF DESCRIPTION OF THE DRAWINGS

FIG. 1 is a sectional view of a self-aligning roller bearing provided with the cage according to this invention;

FIG. 2 is a perspective view of a portion of the cage;

FIG. 3 is an enlarged perspective view of a portion of the cage;

FIG. 4 is a sectional view of the same;

FIG. 5 is a sectional view taken along line V—V of FIG. 4;

FIG. 6 is a sectional view taken along line VI—VI of FIG. 4;

FIG. 7 is a sectional view taken along line VII—VII of FIG. 4;

FIG. 8 is a sectional view taken along line VIII—VIII of FIG. 4;

DETAILED DESCRIPTION OF THE PREFERRED EMBODIMENT

Figure 9:
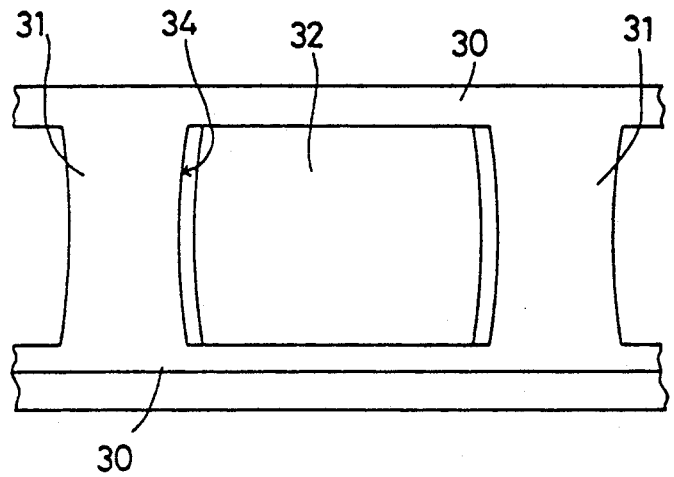
FIG. 9 is a plan view of a prior art cage.
Figure 10:
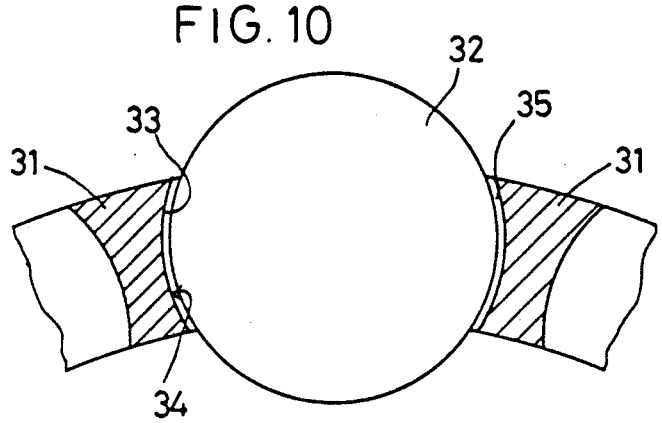
FIG. 10 is a sectional view of the same.

Now the embodiment of this invention will be described with reference to FIGS. 1 to 8.

FIG. 1 shows a self-aligning roller bearing having a cage according to the present invention. It comprises an outer ring 1, an inner ring 2, spherical rollers 3 arranged in a pair of rows between the outer ring 1 and the inner ring 2, and a pair of cages 10 made of synthetic resin for retaining the respective rows of spherical rollers 3.

As shown in FIGS. 2 and 3, each cage 10 has a pair of annular bodies 11 integrally coupled together by a plurality of columns 12 arranged at equal angular intervals. Pockets 13 for housing the spherical rollers 3 are defined between the adjacent columns 12. The cages 10 shown are of a type in which one of the annular bodies 11 is guided by the inner ring 2. It may be guided by the outer ring 1.

As shown in FIGS. 4 and 6, each column 12 is formed on each side thereof at its axially central portion 14 with a flat surface 15 outside the pitch circle of the spherical rollers 3 and a cylindrical surface 16 inside the pitch circle. Each flat surface 15 is parallel to a plane 17 including the axis of each spherical roller 3 and the axis of the cage 10. (FIG. 6)

Each cylindrical surface 16 has its center $0_1$ inwardly offset from the axis of the peripheral rollers 3 and has a radius r1 larger than the maximum radius of the spherical rollers 3.

As shown in FIG. 3, each column 12 is formed on each side at both axially marginal portions 18 thereof with a flat surface 19 and a conical surface 20. As shown in FIGS. 5 and 7, the flat surfaces 19 are located outside the pitch circle of the spherical rollers 3, whereas the conical surfaces 20 are located inside it.

As shown in FIG. 8, the flat surfaces 19 are inclined with respect to a plane 21 including the axis of the spherical rollers 3 and the axis of the cage 10 so as to be in contact with the outer peripheral surface of the spherical rollers 3 at points a while the bearing is rotating. The intersecting line 22 between the plane including each surface 19 and the plane 21 is located outside the cage 10 and is at a right angle with respect to the axis of each spherical roller 3. As shown in FIG. 3, protrusions 23 are provided on the flat surfaces 19 at their outer-diameter side to prevent the spherical rollers 3 from coming out of position.

The spherical rollers 3 are inserted into the pockets 13 from the side of the outer diameter of the cage 10. When inserting them, the protrusions 23 will undergo resilient deformation. In order to facilitate deformation of the protrusions 23, the columns 12 are formed in their outer periphery with an axially extending groove 24. (FIG. 3)

As shown in FIGS. 5 and 7, each conical surface 20 has its center $O_3$ inwardly offset by the distance e from the center $O_2$ of the spherical rollers 3. The conical surfaces 20 have a radius gradually increasing toward the axial center of the columns 12 and are kept out of contact with the outer peripheral surface of the spherical rollers 3.

Since each axially marginal portion 18 on each side face of the columns 12 is in the form of a composite surface comprising the flat surface 19 and the conical surface 20 and each flat surface 19 is kept in contact with the outer periphery of the spherical rollers 3 at a point a while the bearing is rotating, the spherical rollers 3 are guided on the points a. In this state, the points a are located on a plane including the axis of each spherical roller 3 and extending in a tangential direction with respect to the pitch circle of the spherical roller 3. Further, the points a are located not on a plane including the maximum-diameter point of the spherical rollers 3 but apart therefrom toward their ends. (FIG. 8) Thus the spherical rollers are perfectly prevented from skewing.

Also, since wedge spaces are formed to extend from the contact points a toward the outer diameter side, lubricating oil can be absorbed smoothly. Further, since flat surfaces 19 extend outwardly from the pitch circle of the spherical rollers 3 whereas the conical surfaces 20 extend inwardly from the pitch circle with their center of curvature offset inwardly from the axes of the respective spherical rollers 3, a sufficient amount of lubricating oil can pass. This makes it possible to sufficiently lubricate the contact surfaces between the spherical rollers 3 and the columns 12.

With this arrangement, the spherical rollers 3 are perfectly prevented from skewing.

Also, because the spherical rollers make point-to-point contact with the flat surfaces, torque can be kept small. Further, the portions adapted to come into contact with the spherical rollers to guide them are in the form of composite surfaces, each comprising a flat surface and a conical surface and each portion defines a wedge space widening radially outwardly from the contact points. This will enhance the absorption of lubricating oil and improve the lubricating effect.

Since the central portion of each side face of the columns is kept out of contact with the outer peripheral surface of the spherical rollers, no loss of oil film will occur on portions on which the maximum surface pressure acts. This will further improve the lubricating effect.

What is claimed is:

1. A cage made of synthetic resin for use in a self-aligning roller bearing having a plurality of spherical rollers, each cage comprising a pair of annular bodies, and a plurality of columns provided at circumferentially equal spacings to integrally couple said annular bodies together and form a plurality of pockets for retaining the spherical rollers therein, said columns each having side faces formed at both axially end portions thereof with a composite surface comprising a flat surface provided outside the pitch circle of said spherical rollers and a conical surface provided inside the pitch circle, said flat surface being inclined with respect to a plane including the axis of said each spherical roller and the axis of said cage so as to come into point-to-point contact with the outer periphery of said respective spherical roller while the bearing is rotating, said each flat surface intersecting said plane along a line which intersects the axis of said each spherical roller at a right angle, said each column being formed on said each side face at the side of the outer diameter with protrusions to prevent said spherical rollers from coming out of position, said each conical surface having its center offset from the axis of said each spherical roller toward the inner diameter side and having its radius gradually increasing toward the center of said respective side faces of said columns.

* * * * *